Patented Oct. 20, 1925.

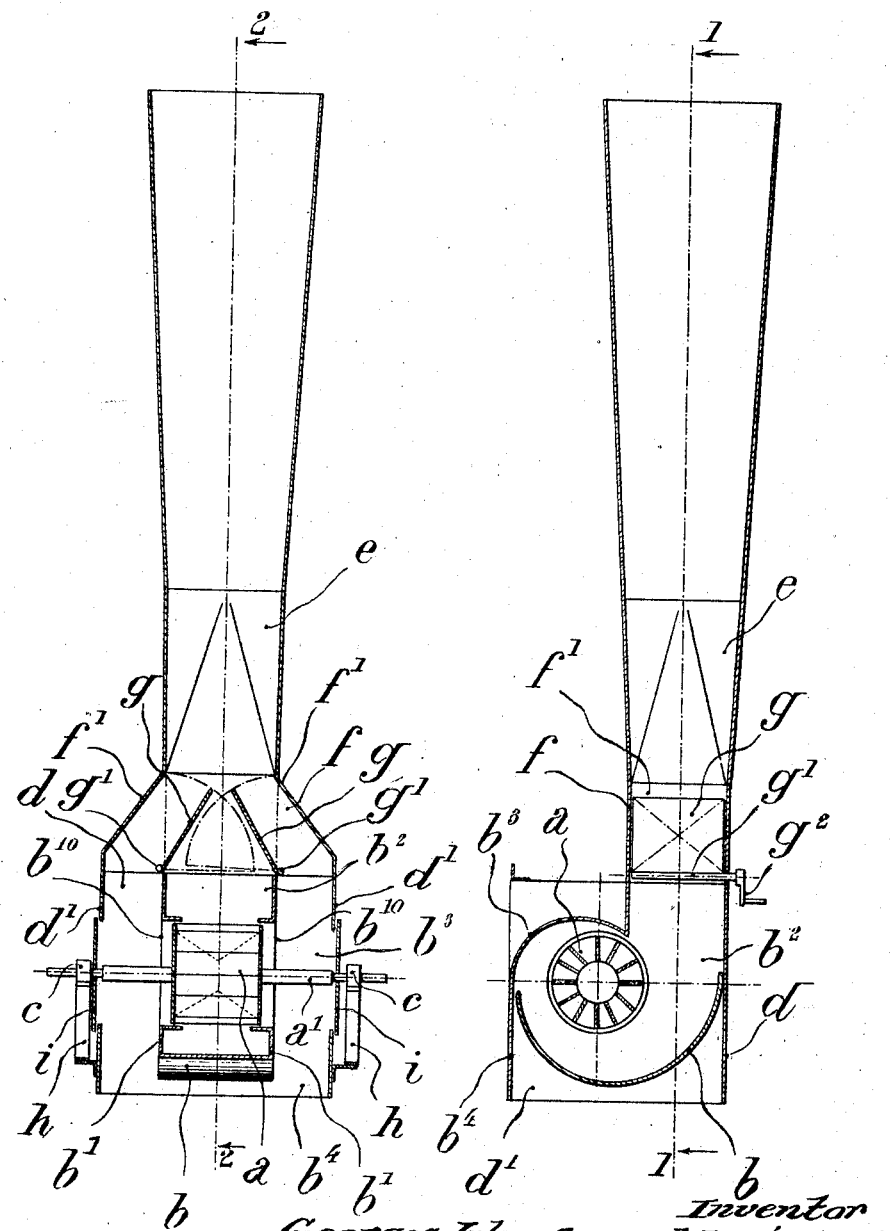

1,558,438

UNITED STATES PATENT OFFICE.

GEORGES JULES ARMAND LOUIS PRAT, OF PARIS, FRANCE.

MEANS FOR PRODUCING MECHANICAL DRAFTS IN CHIMNEYS AND THE LIKE.

Application filed August 30, 1923. Serial No. 660,119½.

*To all whom it may concern:*

Be it known that GEORGES JULES ARMAND LOUIS PRAT, citizen of the French Republic, residing at Paris, France, has invented certain new and useful Improvements in Means for Producing Mechanical Drafts in Chimneys and the like, of which the following is a specification.

This invention relates to means for producing mechanical drafts in chimneys and the like.

It has for its principal object so to construct a plant in which mechanical draft is produced that the said plant shall be more simple in operation and more easy to repair than has hitherto been the case.

The invention consists essentially in providing a suction fan or blower in a plant having mechanical draft, and adjustable shutters or their equivalent, so that the plant can be caused to work either with natural draft alone, or with aspirated or suction draft alone, or by suitably setting the shutters in various positions, with induced draft which may be made to vary to any required extent by suitably modifying the area of the discharge opening from the fan or blower.

The invention also comprises certain constructional embodiments and arrangements which are preferably used in combination and which will be more fully described hereafter.

In the preferred construction the delivery from the fan or blower takes place in the axis of the chimney for carrying away the gases, the natural draft being secured by means of passages left free around the fan or blower and having large sectional areas and gently inclined bends so as to permit the natural draft to take place with the least possible loss of energy.

In order that the invention may be more clearly understood, it will now be described with reference to the accompanying drawing, but it is to be understood that the illustrated embodiment is given merely by way of example.

Fig. 1 of the drawing is a diagrammatic section on the line 1—1 of Fig. 2, showing a portion of a plant for producing mechanical draft according to the invention.

Fig. 2 is a diagrammatic section on the line 2—2 of Fig. 1 of the same plant.

In carrying out the invention, a fan or blower is provided of appropriate size and dimensions, consisting of a rotor $a$, enclosed in a spiral or volute chamber $b$, furnished with lateral walls $b^1$ in which are openings $b^{10}$. At the upper portion is a delivery nozzle $b^2$. The fan or blower has a spindle $a^1$ mounted in bearings in the brackets $c$. $d$ is a casing carried by a frame work and supporting the shaft or chimney $e$, the connection between the chamber $d$ and the said chimney being effected by inclined or convergent pieces $f$. The nozzle $b^2$ preferably opens adjacent the inclined portion $f$ as shown, so that appropriate channels are left between the nozzle and the inclined casing in connection with the passages for ordinary draft.

According to the characteristic feature of the invention and as illustrated in the drawing, the side walls of the spiral or volute chamber $b$, which walls are denoted by $b^1$ are preferably parallel to the side walls $d^1$ of the chamber $d$ which is rectangular so as to leave appropriate spaces between the said walls. The nozzle $b^2$ is also rectangular and opens directly at the bottom of the chimney, which is also made rectangular adjacent the base.

The shutters $g$ are also preferably rectangular and are oscillatably mounted upon horizontal spindles $g^1$ pivotally mounted on opposite sides of the nozzle $b^2$ which are in alignment with the walls $b^1$. These shutters are of such size and shape that when turned in one position they establish communication between the chimney and the fan or blower only. This is the position in which the free edges of the shutters come against the walls $f^1$ of the pieces $f$. In the position, that in which the shutters are folded over one another as shown in dotted lines in Fig. 1, only the spaces between the volute casing $b$ and the chamber $d$ communicate with the chimney.

The shutters are provided with means such as handles $g^2$ for permitting them to be controlled from the outside, said handles being mounted at the extremities of the spindles which in that case project on the outside of the apparatus.

When the shutters are in the first position mentioned, draft is obtained by aspiration or suction only. When they are in the other extreme position, the position in which they would be set when the fan or blower is not working, natural draft is obtained owing to the difference in density between the hot gases and the outer air.

Moreover when the shutters are brought into an intermediate angular position as for example as shown in full lines at Fig. 1, and the blower or fan is working normally, as induced draft varying in value according to the setting of the shutters, can be obtained.

In addition to the structural arrangements hereinbefore described, by which the main principles of the invention are carried out, the following details are advantageously employed.

A sheet metal casing may be provided of such size and shape that, as indicated at Fig. 2 its upper portion $b^3$ forms the curved upper portion of the volute chamber $b$, whilst the lower portion $b^4$ abuts at the bottom of the chamber $d$ outside the corresponding edge of the main conduit or passage. This metal casing connects by its lateral walls to the walls $d^1$ of the chamber $d$. The casing is attached in an appropriate manner to the walls of said chamber, and with this arrangement the gases spread into the lower portion of the casing and into the volute chamber without passing into the portion of the chamber which is above the upper wall of the said volute. This prevents the formation of eddies of gas. The casing may if desired be made of very light material.

The volute chamber $b$ and the casing $d$ may be so constructed that for purposes of repair the parts may be easily removed. For instance the rotor $a$ of the fan and its spindle $a^1$ are carried in removable supporting bearings as shown in Fig. 1. In one at least of the side walls $b^1$ of the chamber $b$, an opening $b^{10}$ is formed of suitable size to permit the withdrawal of the rotor, a pair of these openings $b^{10}$ being preferably provided, one in each side of the casing, as shown, to admit gases to the rotor of the fan. In the corresponding wall $d^1$ of the casing is an opening which may be furnished with a cover $i$ when the apparatus is in use. This construction permits the rotor of the fan or blower to be removed for repair or other purposes.

As will be clearly understood, the invention is not limited to the particular constructional embodiments of its principles which have been just described but includes modifications falling within a fair interpretation of the claim.

What I claim and desire to secure by Letters Patent of the United States of America is:—

In a plant for the production of mechanical draft, the combination of a chimney, having a lower portion of rectangular cross-section, a rectangular enclosure forming a chamber adjacent the rectangular portion of said chimney and communicating therewith, being connected thereto by flat inclined walls, a casing within said chamber the side walls of which are substantially parallel to corresponding walls of said chamber leaving a space therebetween, said casing having a rectangular nozzle opening into said chimney adjacent the juncture of said enclosure and chimney, a fan rotor mounted in said casing, said casing having openings for the passage of gases to said fan rotor, rectangular shutters hingedly carried at the mouth of the nozzle on opposite sides thereof, said shutters being of such size as to engage the walls of the enclosure in one position of said shutters and means for moving said shutters to selectively close the said nozzle against passage of forced draft, or to close the space between the casing and enclosure against passage of natural draft or to partially close the nozzle to cause an induced draft.

In testimony whereof I have hereunto set my hand.

GEORGES JULES ARMAND LOUIS PRAT.